United States Patent
Matsumoto et al.

(10) Patent No.: US 8,121,376 B2
(45) Date of Patent: Feb. 21, 2012

(54) DIAGNOSTIC IMAGING SUPPORT PROCESSING APPARATUS AND DIAGNOSTIC IMAGING SUPPORT PROCESSING PROGRAM PRODUCT

(75) Inventors: Sumiaki Matsumoto, Kobe (JP); Hitoshi Yamagata, Otawara (JP)

(73) Assignees: National University Corporation Kobe University, Kobe-shi (JP); Toshiba Medical Systems Corporation, Otawara-shi (JP)

( * ) Notice: Subject to any disclaimer, the term of this patent is extended or adjusted under 35 U.S.C. 154(b) by 457 days.

(21) Appl. No.: 12/407,087

(22) Filed: Mar. 19, 2009

(65) Prior Publication Data

US 2009/0238425 A1    Sep. 24, 2009

(30) Foreign Application Priority Data

Mar. 21, 2008    (JP) ................................. 2008-074637

(51) Int. Cl.
*G06K 9/00*    (2006.01)
(52) U.S. Cl. ...................................................... 382/131
(58) Field of Classification Search .................. 382/128, 382/131
See application file for complete search history.

(56) References Cited

U.S. PATENT DOCUMENTS

| | | |
|---|---|---|
| 2007/0230763 A1 | 10/2007 | Matsumoto et al. |
| 2007/0286469 A1 | 12/2007 | Yamagata et al. |
| 2008/0170771 A1* | 7/2008 | Yamagata et al. ............ 382/128 |
| 2009/0041324 A1 | 2/2009 | Yamagata et al. |

FOREIGN PATENT DOCUMENTS

| | | |
|---|---|---|
| JP | 2006-239005 | 9/2006 |
| JP | 2008-7033 | 1/2008 |
| JP | 2008-12291 | 1/2008 |

OTHER PUBLICATIONS

David S. Paik et al., "Surface Normal Overlap: A Computer-Aided Detection Algorithm With Application to Colonic Polyps and Lung Nodules in Helical CT", IEEE Transactions on Medical Imaging, vol. 23, No. 6, Jun. 2004, pp. 661-675.

Shodayu Takashima et al., "Small Solitary Pulmonary Nodules (≦1 cm) Detected at Population-Based CT Screening for Lung Cancer: Reliable High-Resolution CT Features of Benign Lesion", AJR AM J Roentgenal, Apr. 2003; pp. 955-964.

* cited by examiner

*Primary Examiner* — Roy M Punnoose
(74) *Attorney, Agent, or Firm* — Oblon, Spivak, McClelland, Maier & Neustadt, L.L.P.

(57) ABSTRACT

A diagnostic imaging support processing apparatus includes a nodular region determination unit which determines a nodular region included in an image showing the inside of a subject, a polygonal line approximation processing unit which obtains a plurality of nodes constituting a polygonal line that approximates a contour of the nodular region, a reference position determination unit which determines a position of a reference point, and a circularity computation unit which computes the degree of circularity by using areas of a plurality of regions determined based on the plurality of nodes and the reference point.

10 Claims, 15 Drawing Sheets

5120-hedron

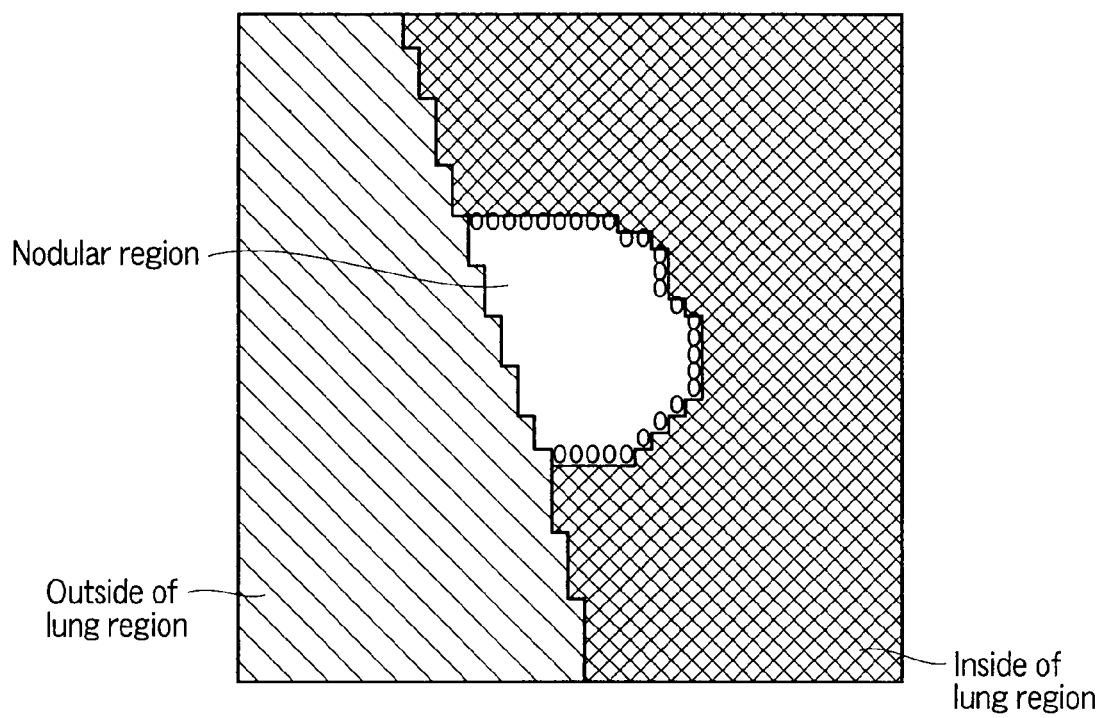
F I G. 11
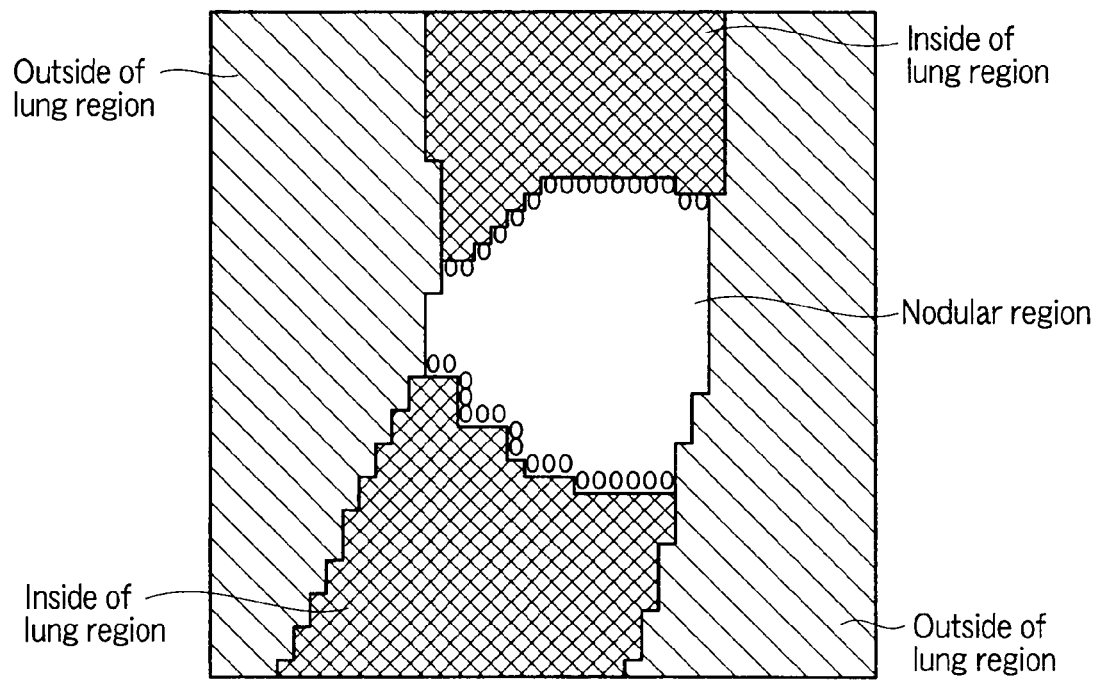
F I G. 12

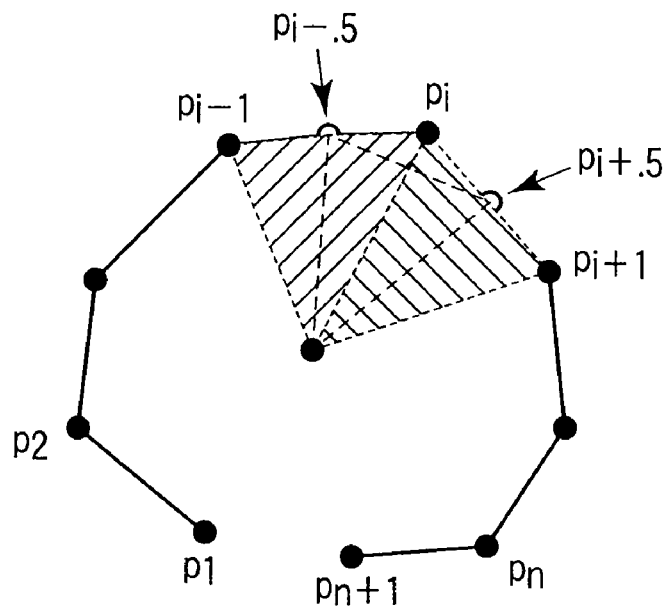
F I G. 16
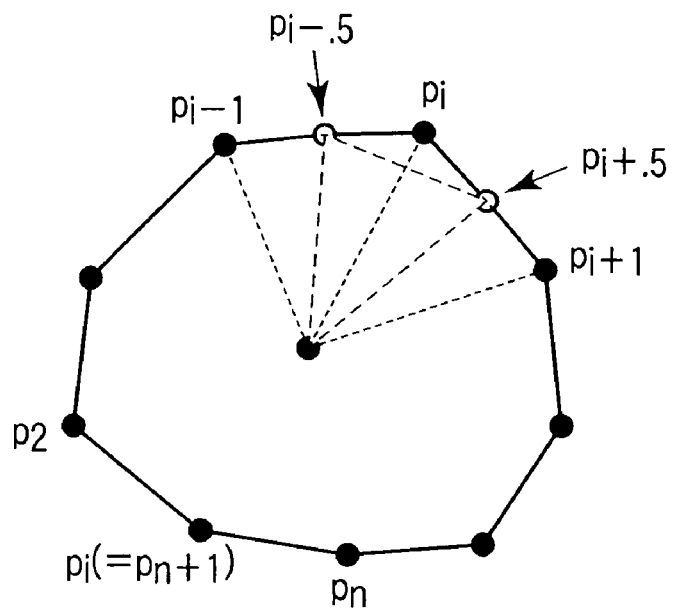
F I G. 17

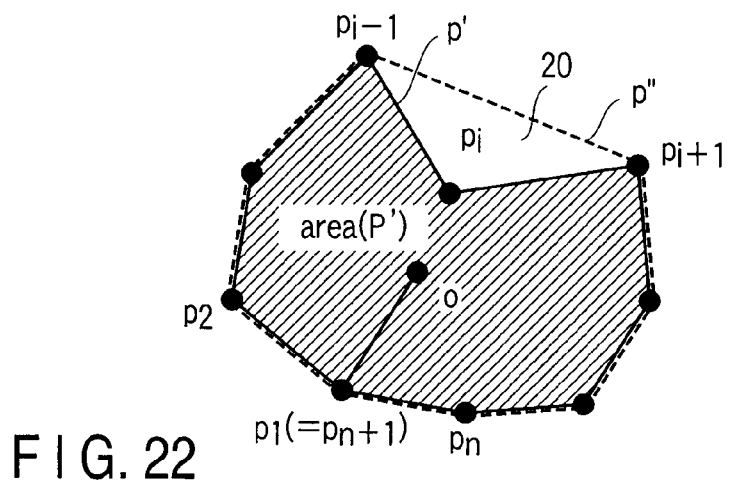
F I G. 22
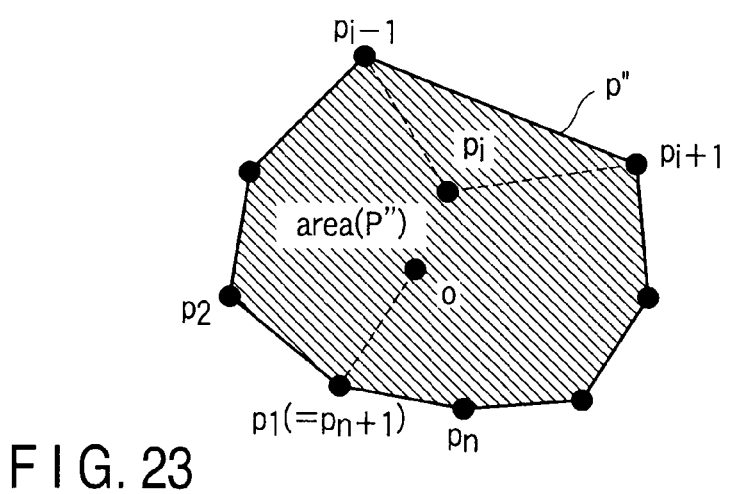
F I G. 23
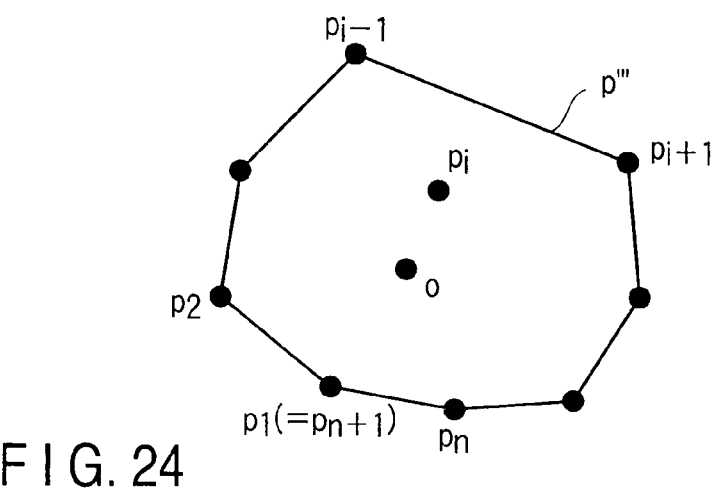
F I G. 24

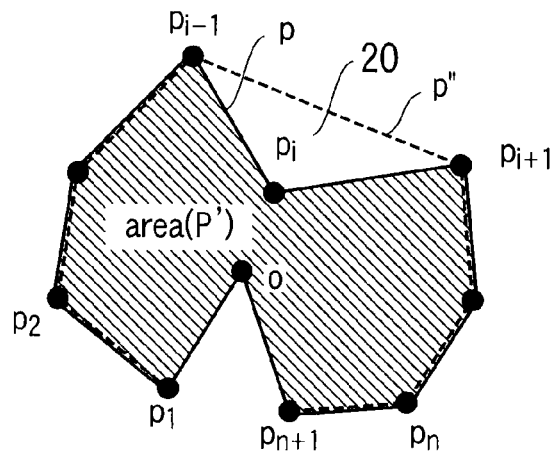
F I G. 25
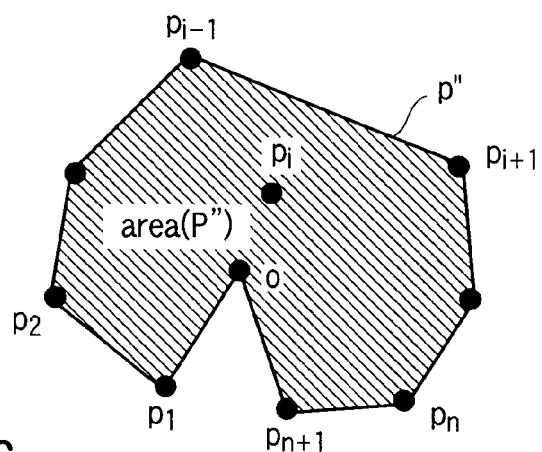
F I G. 26
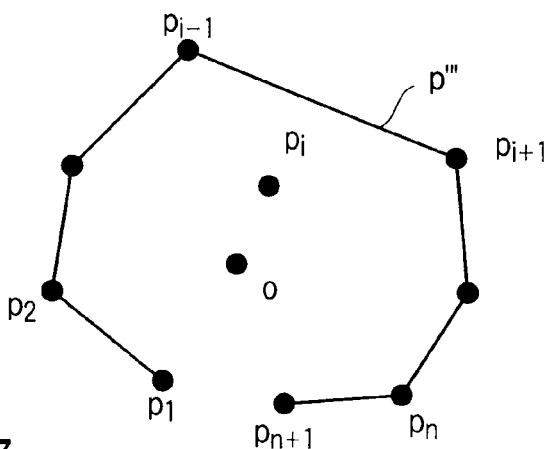
F I G. 27

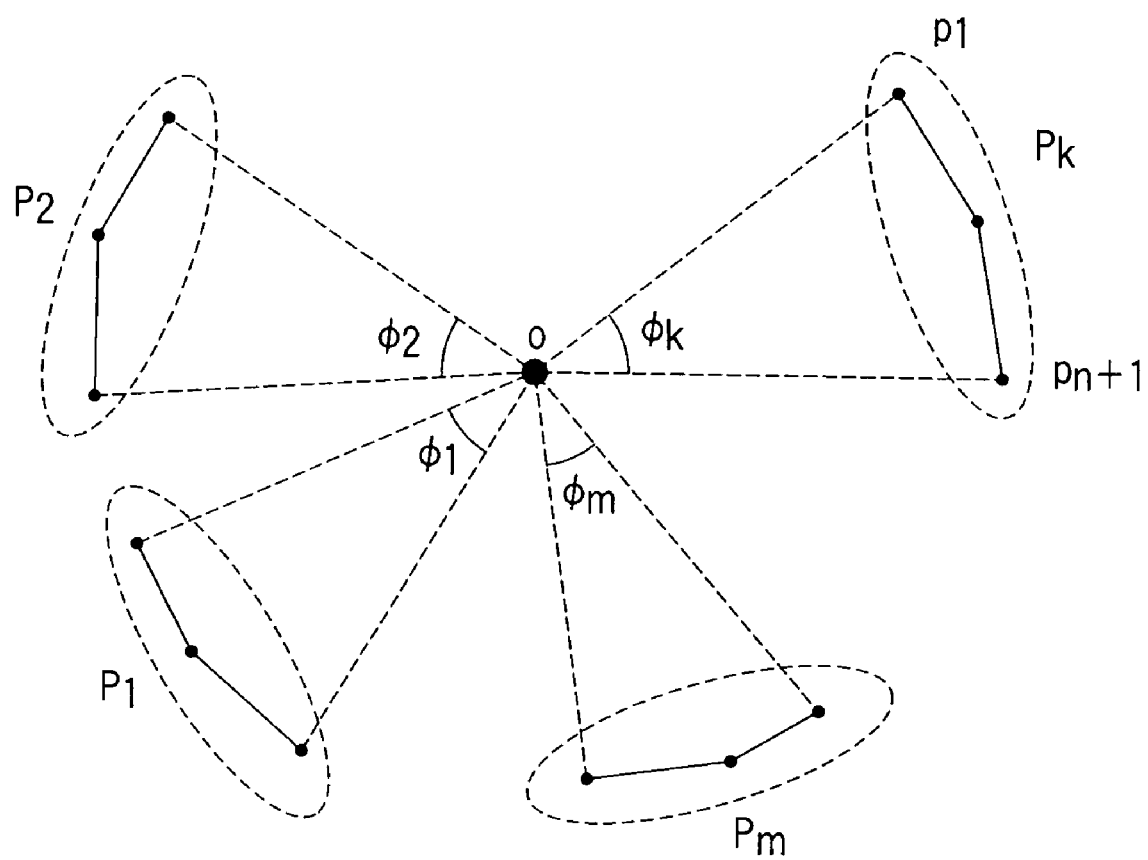
F I G. 28

DIAGNOSTIC IMAGING SUPPORT PROCESSING APPARATUS AND DIAGNOSTIC IMAGING SUPPORT PROCESSING PROGRAM PRODUCT

CROSS-REFERENCE TO RELATED APPLICATIONS

This application is based upon and claims the benefit of priority from prior Japanese Patent Application No. 2008-074637, filed Mar. 21, 2008, the entire contents of which are incorporated herein by reference.

BACKGROUND OF THE INVENTION

1. Field of the Invention

The present invention relates to a diagnostic imaging support processing apparatus and a diagnostic imaging support processing program product that support a diagnosis about an anatomic abnormality such as a nodular abnormality or a varicose vascular abnormality based on three-dimensional images collected by using a medical diagnostic imaging modality, e.g., an X-ray computer tomographic apparatus, an X-ray diagnostic apparatus, a magnetic resonance diagnostic apparatus, or an ultrasonic diagnostic apparatus.

2. Description of the Related Art

At the present day, a lung cancer heads a list of malignant deaths and goes on increasing in Japan. Therefore, a social demand for early detection is strong with respect to the lung cancer like precaution as a countermeasure for smoking. In each municipalities in Japan, a lung cancer examination based on a chest plain radiograph and a sputum cytodiagnosis is carried out. However, a report "Study Group Concerning Cancer Examination Effectiveness Evaluation" issued from Health and Welfare Ministry in Japan in 1998 concludes that a current lung cancer examination has effectiveness but it is small. An X-ray computer tomography (which will be referred to as a CT hereinafter) can readily detect a lung field type lung cancer as compared with a chest plain radiograph, but it was not able to be used for examination since its imaging time is long before 1990 when a helical scanning type CT (helical CT) appeared. However, soon after the helical CT appeared, a method of using a relatively low X-ray tube current to perform imaging for a reduction in radiation exposure (which will be referred to as a low-dose helical CT hereinafter) was developed, and a pilot study of a lung cancer examination using this method was carried out in Japan and the United States. As a result, a fact that the low-dose helical CT has a lung cancer detection rate greatly higher than that of the chest plain radiograph was proved.

On the other hand, a time required for imaging by the helical CT is kept being reduced due to an increasing number of CT detectors since 1998. The latest multi-detector helical CT can scan the entire lungs in less than 10 seconds with high spatial resolution that is nearly isotropic. Such a technological innovation has significantly increased the likelihood of small lung cancer being depicted by CT. However, high-resolution scanning with multi-detector helical CT has the drawback of considerably increasing the workload of image interpretation since hundreds of images are generated per scan.

Because of this situation, it is widely recognized that a computer assisted diagnosis (which will be referred to as a CAD hereinafter) using a computer to avoid overlooking lung cancer is required for the low-dose helical CT to be established as a lung cancer examination method.

Since a small lung cancer in a lung field appears as a nodular abnormality in a CT image, automatic detection of such an abnormality is an important theme, and various studies have been conducted since the 1990's (see, e.g., "David S. Paik and seven others, "Surface Normal Overlap: A Computer-aided Detection Algorithm with Application to Colonic Polyps and Lung Nodules in Helical CT", IEEE Transactions on Medical Imaging, Vol. 23, No. 6, June 2004, pp. 661-675").

The present applicant has suggested a technology for analyzing a nodule candidate and a peripheral structure thereof to automatically three-dimensionally detect a nodule as JP-A 2006-239005 (KOKAI) (WO/2006/093085). The present applicant has also suggested a technology related to display of an automatically detected nodular region and a peripheral region thereof in JP-A 2008-12291 (KOKAI). The present applicant has further suggested a technology for analyzing a nodule and a peripheral region thereof to automatically determine an anatomic malignancy of the nodule in JP-A 2008-7033 (KOKAI).

Meanwhile, in the lungs that are major target organs for CAD, the following physiological/pathological changes on CT are frequently observed in contact with the pleura.

(1) A slight increase in lung field density (a ground-glass opacity) reflecting venous stasis or reduced ventilation is often seen underneath the pleura, and when this increase in density is not uniform, the such areas with nonuniform density can appear as vague nodules.

(2) Findings of fibrosis or scars presumably resulting from previous pleuritis and/or pneumonia are very common along the pleura.

(3) Preclinical interstitial pulmonary diseases can be incidentally revealed by CT. In such cases, it is not uncommon for alveolitis due to these diseases, which tends to occur near the pleura, to appear as local ground-glass opacity.

For physicians who undertake diagnostic imaging, it is a simple task to discriminate the above-described abnormalities near the pleura from possibly malignant nodules. In most cases, this judgment is made by viewing axial images only, which implies that two-dimensional morphological information, i.e., mainly silhouette or shape, of lesions is helpful enough in this judgment.

Meanwhile, in the diagnosis of small lung lesions, polygonal shape is reported as one of the criteria predictive for benign lesions (see, e.g., Takashima S., et al. Small solitary pulmonary nodules (1 cm) detected at population-based CT screening for lung cancer: Reliable high-resolution CT features of benign lesions. AJR Am J Roentgenol. 2003; 180: 955-964).

For example, when the contour of a small pulmonary lesion can be well approximated by a triangle, the lesion is most likely a scar and thus can be safely disregarded. In general, for a lesion whose contour is well approximated by a polygon with n vertices, the possibility that the lesion is neoplastic can be considered to increase as n increases, because the shape of the lesion becomes closer to a circle as n increases. Thus a quantity that monotonically increases with n is desired in order to represent the shape characteristics of small lung lesions. Classically, one such quantity is the degree of circularity defined as $4\pi A/L^2$ where A and L are the area and circumference of a two-dimensional object, respectively. For given L, A is maximized when the object is perfectly circular. Thus the maximum value of the degree of circularity is 1.

In CAD, the degree of circularity may be used as one of the parameters for the selection among intermediate nodule candidates. In this case, by using the threshold for the degree of circularity set to e.g., 0.8, nodule candidates with the values of the degree of circularity not less than the threshold are selected.

Suppose that there is a semi-circular shaped nodule in contact with the pleura. Intuitively, such a nodule is round enough to be described as protruding, implying that the nodule is possibly neoplastic. For this nodule, the value of the degree of circularity defined above is approximately 0.75 because the shape of the nodule is semicircular. Therefore, when the threshold for the degree of circularity is 0.8, this nodule is not selected, thus resulting in false-negative detection which decreases the sensitivity of CAD. Such false-negative detection can be avoided by lowering the threshold to e.g., 0.6. By so doing, however, the number of false positives most likely increases.

As indicated by the foregoing, for lesions in contact with the pleura, the above degree of circularity does not well quantify the intuitive roundness of the lesion. Hence this degree of circularity is considered to be unsuitable as a parameter for the selection of nodule candidates in CAD of pulmonary nodules.

BRIEF SUMMARY OF THE INVENTION

Under the circumstances, there is a need for an index that can quantify the roundness of various nodular lesions, i.e., nodular lesions in contact with the pleura or isolated nodular lesions, in a unified manner.

According to a first aspect of the present invention, there is provided a diagnostic imaging support processing apparatus comprising: a nodular region determination unit which determines a nodular region included in an image showing the inside of a subject; a polygonal line approximation processing unit which obtains a plurality of nodes constituting a polygonal line that approximates a contour of the nodular region; a reference position determination unit which determines a position of a reference point; and a circularity computation unit which computes the degree of circularity by using areas of a plurality of regions determined based on the plurality of nodes and the reference point.

According to a second aspect of the present invention, there is provided a diagnostic imaging support processing apparatus comprising: a unit which obtains a plurality of processing cross sections that divide an image of a three-dimensional spatial image in a subject; a nodular region determination unit which determines a nodular region included in an image associated with the processing cross sections; a polygonal line approximation processing unit which obtains a plurality of nodes constituting a polygonal line that approximates a contour of the nodular region; a reference position determination unit which determines a position of a reference point; and a circularity computation unit which computes a degree of circularity by using areas of a plurality of regions determined based on the plurality of nodes and the reference point.

According to a third aspect of the present invention, there is provided a diagnostic imaging support processing apparatus comprising: a nodular region determination unit which determines a nodular region included in an image representing the inside of a subject; a contour extraction unit which extracts a contour of the nodular region; an organ region detection unit which detects a region of a predetermined organ; a determination unit which determines whether the nodular region is in contact with a part outside the organ region; and a circularity computation unit which computes the degree of circularity based on information of the contour of the nodular region and a determination result of the determination unit.

According to a fourth aspect of the present invention, there is provided a diagnostic imaging support processing apparatus comprising: a extraction unit which determines a plurality of nodes near a border between a region representing a tissue in which a nodule may arise and a nodular region which possibly represents a nodule in a cross-sectional image of a subject, and extracts a contour of the nodular region as one or more polygonal lines formed of a plurality of line segments each having as end points two nodes adjacent to each other along the border in the plurality of nodes; a first unit which obtains one or more modified polygonal lines by modifying the one polygonal line or each of the plurality of polygonal lines into a shape having no portion that is concave on the reference point side; a second unit which computes a plurality of characteristic amounts related to each of the plurality of nodes serving as an end point common to two in a plurality of line segments included in the one or more modified polygonal lines; a third unit which obtains one or more first areas as an area of each region surrounded by the one polygonal line or each of the plurality of polygonal lines; a fourth unit which obtains one or more second areas as an area of each region surrounded by the one modified polygonal line or each of the plurality of modified polygonal lines; and a fifth unit which computes the degree of circularity of the nodular region in the cross-sectional image based on the plurality of characteristic amounts and each of the one or more first areas and the one or more second areas.

According to a fifth aspect of the present invention, there is provided a diagnostic imaging support processing computer readable program product that allows a computer to function as: a nodular region determination unit which determines a nodular region included in an image showing the inside of a subject; a polygonal line approximation processing unit which obtains a plurality of nodes constituting a polygonal line that approximates a contour of the nodular region; a reference position determination unit which determines a position of a reference point; a circularity computation unit which computes the degree of circularity by using areas of a plurality of regions determined based on the plurality of nodes and the reference point.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 11 is a view showing an example of extraction of an object contour line;

FIG. 12 is a view showing an example of extraction of an object contour line;

FIG. 16 is a view showing a model for computation of the degree of arc related to an opened polygonal line;

FIG. 17 is a view showing a model for computation of the degree of arc related to a closed polygonal line;

FIG. 22 is a view showing an example of a closed polygonal line having a portion that is concave on a reference point side;

FIG. 23 is a view showing an example of a polygonal line deformed from the polygonal line depicted in FIG. 22;

FIG. 24 is a view showing an example of a polygonal line as a target of the polygonal line circularity computation processing;

FIG. 25 is a view showing an example of an opened polygonal line having a portion that is concave on a reference point side;

FIG. 26 is a view showing an example of a polygonal line deformed from the polygonal line depicted in FIG. 25;

FIG. 27 is a view showing an example of a polygonal line as a target of the polygonal line circularity computation processing;

FIG. 28 is a view showing a relationship between a plurality of curve components included in an object contour line.

DETAILED DESCRIPTION OF THE INVENTION

Hereinafter, an embodiment according to the present invention will be described with reference to the accompanying drawings.

Figure 1:
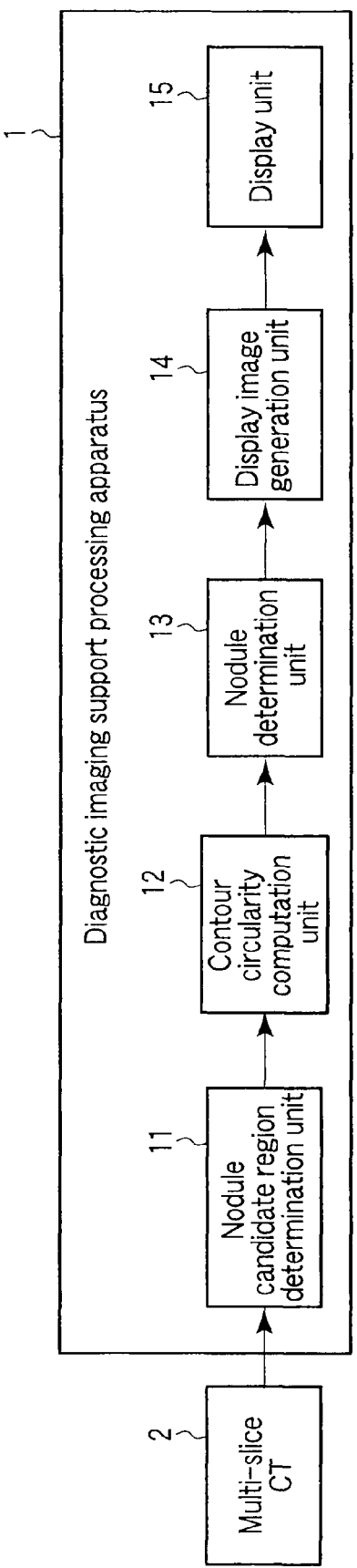
FIG. 1 is a view showing a structure of a diagnostic imaging support processing apparatus according to an embodiment of the present invention.

FIG. 1 is a view showing a structure of a diagnostic imaging support processing apparatus 1 according to this embodiment.

In the diagnostic imaging support processing apparatus 1 depicted in FIG. 1, three-dimensional image data acquired by a multi-slice CT 2 is a processing target. The diagnostic imaging support processing apparatus 1 includes a nodule candidate region determination unit 11, a contour circularity computation unit 12, a determination unit 13, a display image generation unit 14, and a display unit 15 as shown in FIG. 1.

In this diagnostic imaging support processing apparatus 1, for example, a general-purpose computer apparatus can be used as basic hardware. Further, the nodule candidate region determination unit 11, the contour circularity computation unit 12, the determination unit 13, and the display image generation unit 14 can be realized by executing a diagnostic imaging support processing program by a processor mounted in the computer apparatus. At this time, the diagnostic imaging support processing apparatus 1 may be realized by previously installing the diagnostic imaging support processing program in the computer apparatus, or it may be realized by installing in the computer apparatus the diagnostic imaging support processing program product that is recorded on a removable recording medium, e.g., a magnetic disk, a magneto-optical disk, or a semiconductor memory or distributed by means of communication over a network. It is to be noted that a part or all of each unit can be realized by hardware, e.g., a logic circuit. Further, each unit can be realized by combining hardware and software control.

The nodule candidate region determination unit 11 determines a region that can be a nodule (which will be referred to as a nodular region hereinafter) in a three-dimensional image (which will be referred to as a processing target image hereinafter) represented by three-dimensional image data as a processing target. The contour circularity computation unit 12 computes the degree (which will be referred to as a contour circularity degree hereinafter) of circularity of the contour related to a nodular region based on a processing target region by later-explained processing. The nodule determination unit 13 determines whether a nodular region is a nodule based on a characteristic amount of each of a nodule candidate region and a peripheral region thereof. It is to be noted that the nodule determination unit 13 makes reference to the contour circularity degree computed by the contour circularity computation unit 12. The display image generation unit 14 generates a display image that is provided to read, e.g., a determination result from the nodule determination unit 13 by a doctor. The display unit 15 displays the display image. As the display unit 15, a display device such as a CRT or a liquid crystal display unit can be utilized. The display unit 15 may not be included in the diagnostic imaging support processing apparatus 1, and it may be externally provided.

First Embodiment

An operation of the thus configured diagnostic imaging support processing apparatus 1 in the first embodiment will now be explained.

It is to be noted that a line segment connecting a point $p_a$ with a point $p_b$ in three points $p_a$, $p_b$, and $p_c$ is represented as a line segment $p_a p_b$, and a line segment in which line segment $p_a p_b$ is coupled with a line segment $p_b p_c$ is represented as a line segment $p_a p_b p_c$. Furthermore, an area of a triangle having points $p_a$, $p_b$, and $p_c$ as apexes is represented as $\triangle p_a p_b p_c$, and an angle formed by line segment $p_a p_b p_c$ with respect to point $p_b$ is represented as $\angle p_a p_b p_c$.

A characteristic operation in the diagnostic imaging support processing apparatus 1 is processing in the contour circularity computation unit 12. Therefore, the processing in this contour circularity computation unit 12 will be mainly explained in detail hereinafter.

The contour circularity computation unit 12 computes the contour circularity degree in regard to each of nodular regions determined by the nodule candidate region determination unit 11 as follows. It is to be noted that determination of the nodular regions by the nodule candidate region determination unit 11 can be performed based on a technology disclosed in, e.g., JP-A 2006-239005 (WO/2006/093085), and a description thereof is incorporated herein.

Figure 2:
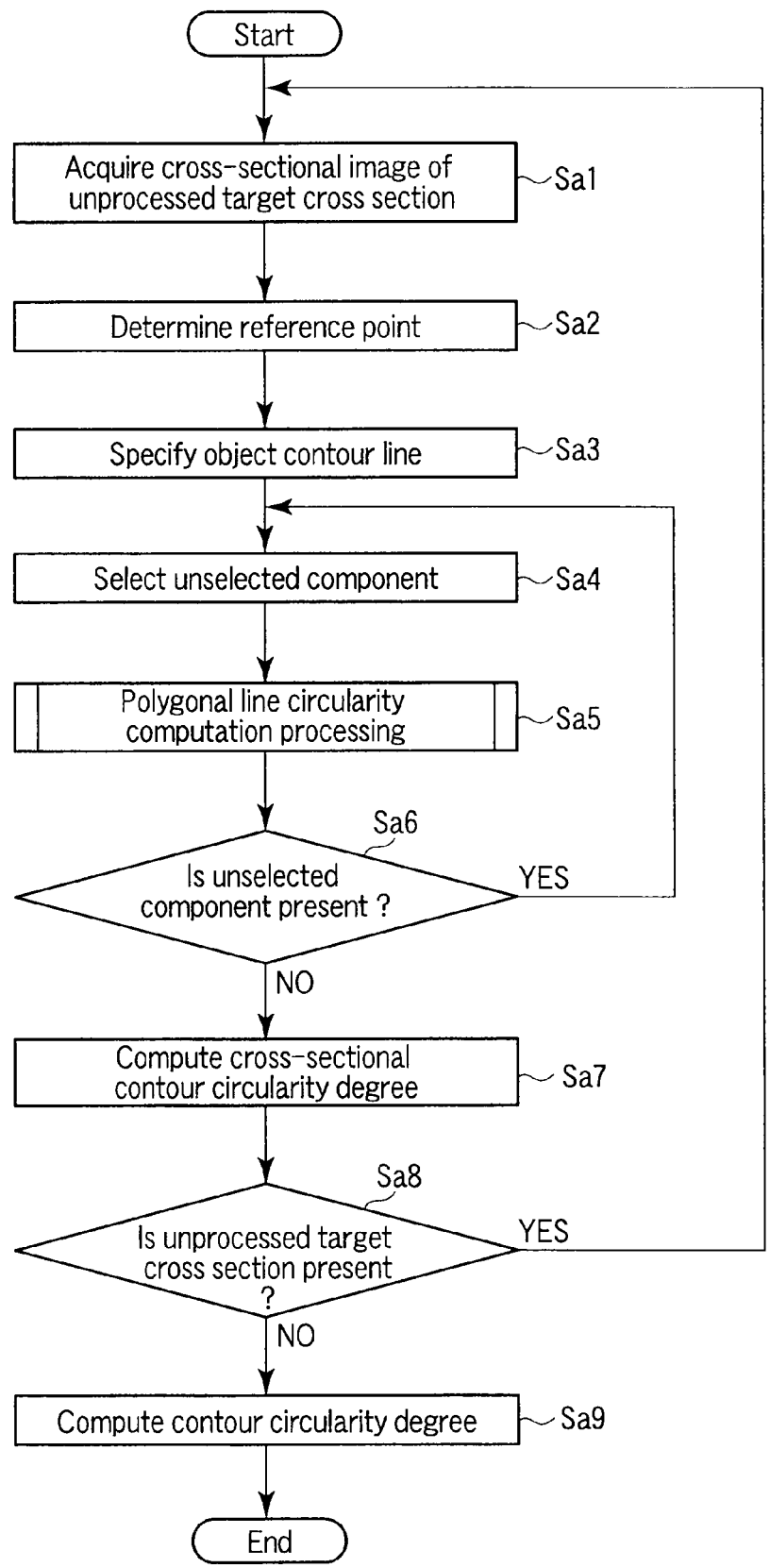
FIG. 2 is a flowchart showing a processing procedure of a contour circularity computation unit depicted in FIG. 1.

FIG. 2 is a flowchart showing a processing procedure of the contour circularity computation unit 12 in the first embodiment.

Figure 3:
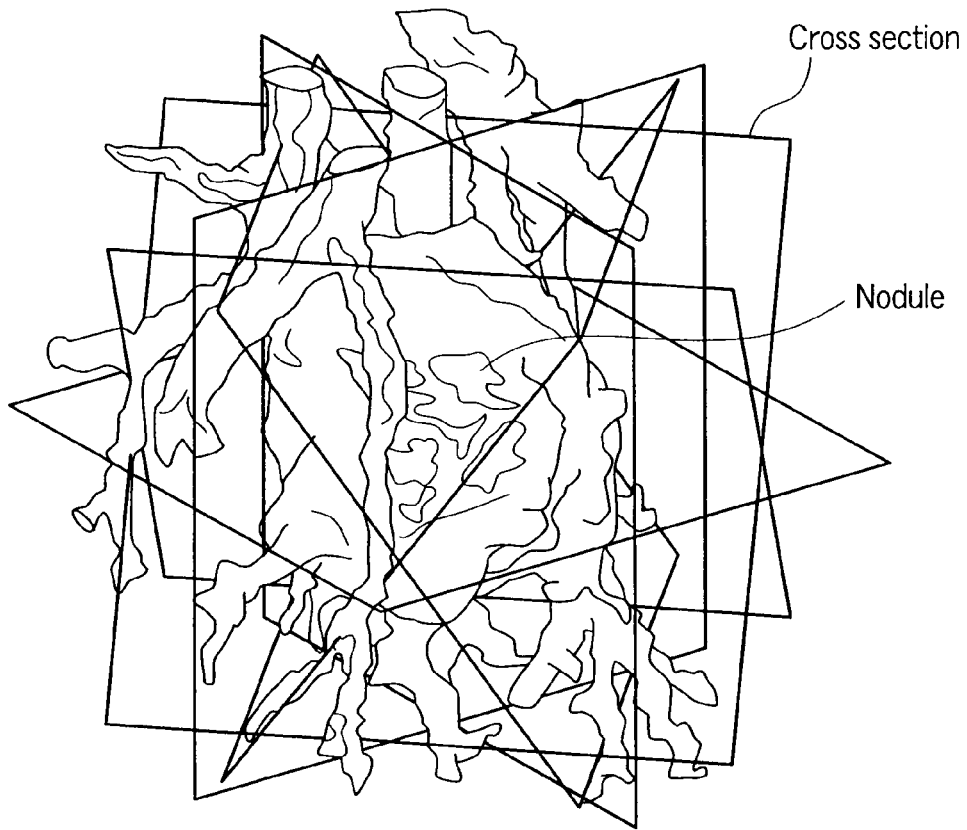
FIG. 3 is a view showing an example of cross sections from which cross-sectional images are acquired.

In step Sa1, the contour circularity computation unit 12 acquires cross-sectional images of unprocessed cross sections in a plurality of such cross sections having different directions as shown in FIG. 3 (which will be referred to as processing target cross sections hereinafter) based on, e.g., multiplannar reconstruction (MPR) for processing target images.

A technique of determining positions, a number, and directions of the preset processing target cross sections will now be explained.

A three-dimensional spatial point through which the processing target cross section runs will be first explained. JP-A 2008-12291 discloses a technology of setting an appropriate three-dimensional area of interest with respect to a temporary center of each nodule candidate region (a nodular region) and applying threshold processing using an adaptively determined threshold density to this area of interest to obtain a precursor region (an extended nodule candidate region) as a (three-dimensional) binary image, and a description of this technology will be incorporated herein. Furthermore, a domain of the precursor region is given as a part in a lung region in the area of interest. Thus, the temporary center is determined as a three-dimensional spatial point through which the processing target cross section runs.

A determination method for the number and directions of processing target cross sections will now be explained.

When the number of processing target cross sections is increased, a shape of each nodular region must be considered in detail, and reliability of the computed contour circularity degree is improved. At the same time, when the number of processing target cross sections is increased, a time required to compute the contour circularity degree is increased. Thus, it is desirable to appropriately determine a correlative direction of processing target cross sections so that a shape of each nodular region can be multilaterally grasped even if the number of processing target cross sections is small.

First, a total number of planes having different directions is represented as n. Since directions of the planes are specified by unit normal vectors, selecting n from a set of all possible unit normal vectors enables selecting n planes. End points of these unit normal vectors form a semicircular surface. Therefore, to ideally take directions of the processing target cross sections, enabling arranging end points of the n unit normal vectors on a semicircular surface at equal intervals is demanded. In general, arranging the ends points at equal intervals is impossible except for a case where n=2, 3, 4, 6, or 10 corresponding to a regular tetrahedron, a regular hexahedron, a regular octahedron, a regular dodecahedron, or a regular icosahedron, and the reliability is insufficient when n=10. Therefore, quasi-even end points of unit normal vectors which are appropriate when n=11 or above are utilized to determine directions of n processing target cross sections on the following two stages.

(First Stage)

Figure 4:
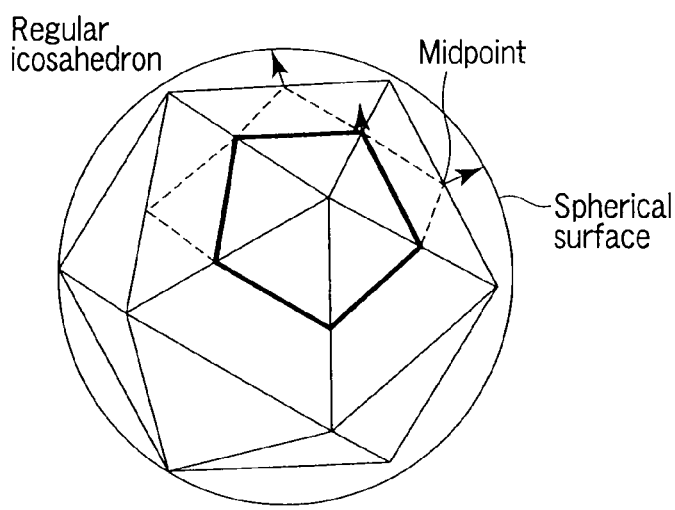
FIG. 4 is a view showing a divided region (a regular icosahedron) on a spherical surface.
Figure 5:
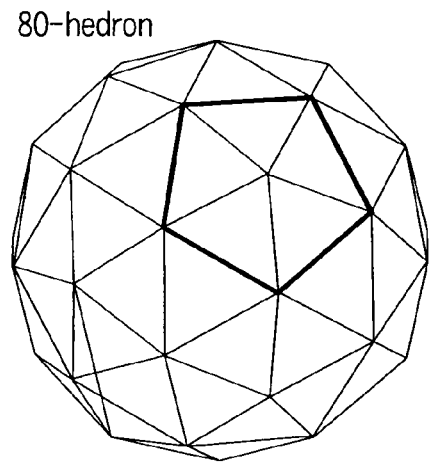
FIG. 5 is a view showing a divided region (an 80-hedron) on a spherical surface.
Figure 6:
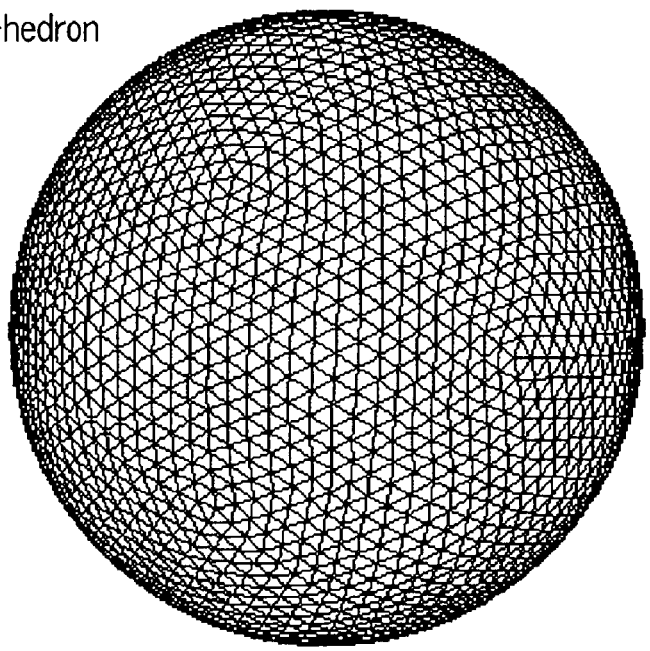
FIG. 6 is a view showing a divided region (a 5120-hedron) on a spherical surface.

To obtain quasi-even arrangement of 2n points on a spherical surface, a sphere is first approximated by a polyhedron having N (>>2n) surfaces. This can be obtained by recursively redividing the polyhedron approximating the sphere. As first approximation, the regular icosahedron corresponding to n=10 is used. In the single redivision, each side coupling midpoints of two sides sharing each surface of the polyhedron before the redivision as shown in FIG. 4 is introduced, thereby dividing each surface into four surfaces. Moreover, each new apex (the midpoint of the original side) is moved to match with projection onto its spherical surface, thereby providing a redivided polyhedron. FIG. 5 shows a stage where an 80-hedron is formed from the regular icosahedron. When this recursive redivision is carried out for, e.g., four times, a 5120-hedron is obtained as shown in FIG. 6.

In general, a polyhedron can be defined by a mesh representing its surface (a surface mesh). In processing of approximating a fine mesh by a rough mesh, a technology of causing each surface in a rough mesh to have substantially the same size is called isotropic remeshing in the field of computer graphics. To obtain quasi-even arrangement of 2n points on a spherical surface, an algorithm that performs isotropic remeshing based on a centroidal Voronoi diagram which is explained below is utilized. That is, a surface of an N-hedron is divided into 2n regions having substantially the same shapes and sizes, and centroids of these regions are obtained, thereby providing 2n points. This algorithm is described in, e.g., Valette S. and Chassery J-M., Eurographics 2004, vol. 23, pp. 318-389, and this description will be incorporated herein.

Figure 8:
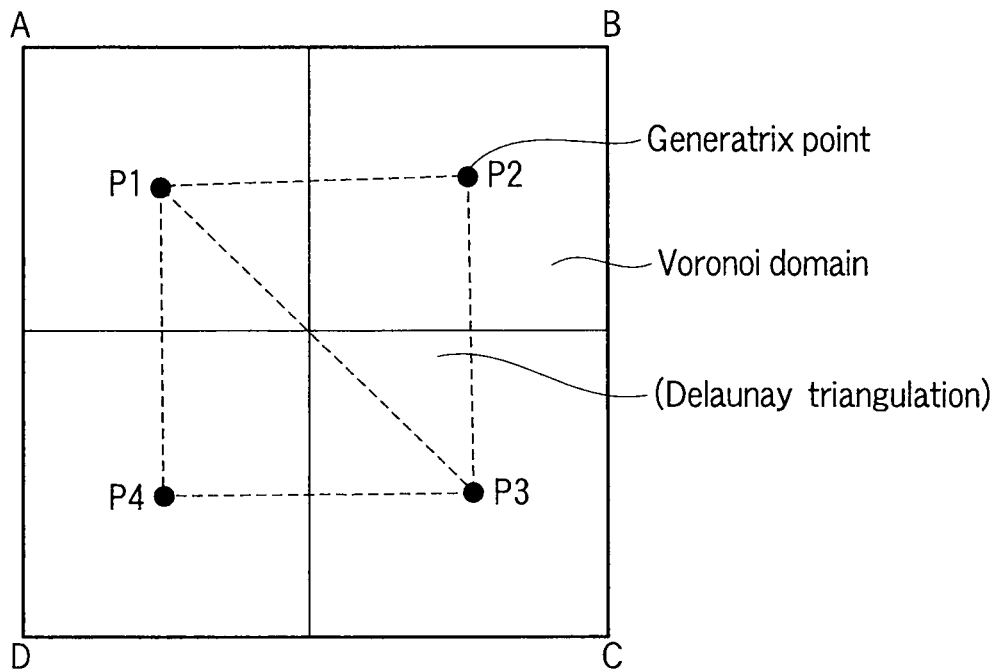
FIG. 8 is a view showing a Voronoi diagram.

Centroidal Voronoi Diagram:

It is assumed that four points P1, P2, P3, and P4 (to be referred to as generatrices) are arranged in such a square ABCD as shown in FIG. 8 for simplicity. First, a Voronic diagram means a diagram determined in such a manner that the square is divided into four parts respectively including these generatrices and each divided region (which will be referred to as a Voronoi domain) becomes a point set where the generatices are contiguous to the full extent at an arbitrary point in the region. The centroidal Voronoi diagram is a Voronoi diagram in which a centroid of each Voronoi domain matches with a generatrix.

Figure 7:
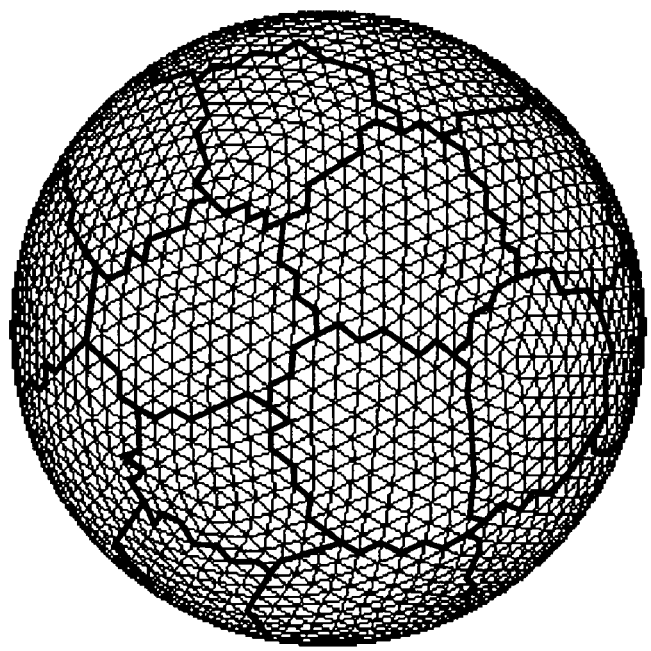
FIG. 7 is a view showing an approximate Voronoi domain on a spherical surface.
Figure 9:
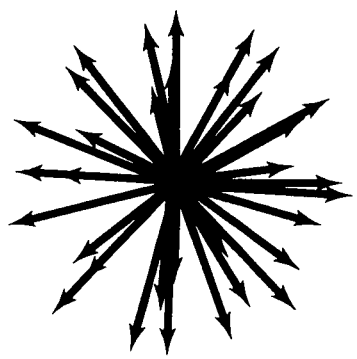
FIG. 9 is a view showing unit normal vectors each using a centroid of the approximate Voronoi domain as an end point.

FIG. 7 shows a state where this algorithm is used to divide the polyhedron shown in FIG. 4 into 36 approximate Voronoi domains as an example. It is to be noted that each region sectioned by a solid line is an approximate Voronoi domain. FIG. 9 shows unit normal vectors each using a centroid of each of these regions as an end point.

(Second Stage)

Figure 10:
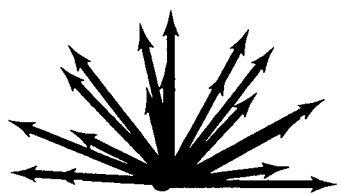
FIG. 10 is a view showing unit normal vectors in a semispherical region.

Arbitrary n vectors on a semispherical side are adopted from the 2n unit normal vectors determined on the first stage. For example, as shown in FIG. 10, (18) unit normal vectors which are a half of the unit normal vectors depicted in FIG. 9 are adopted, and end points of these vectors are associated with 18 processing target cross sections.

Summing up, processing target cross sections run through temporary centers of the respective nodule candidate regions (nodular regions), and 18 cross sections having cross sections associated with the respective 18 unit normal vectors are provided as an example.

In step Sa2, the contour circularity computation unit 12 determines a reference point o in the nodular region in each cross-sectional image acquired in step Sa1. Specifically, the reference point o is a centroid in a maximal region that is produced in the nodular region in a distance converted image obtained by performing distance conversion with respect to a processing target image (a binary image). However, when the maximal region is formed of a single pixel, the center of this pixel is simply determined as the reference point o. When the plurality of maximal regions are present, a maximal region that is closest to a temporary center computed when detecting the nodular region is selected, and a centroid of this selected region is determined as the reference point o.

In step Sa3, the contour circularity computation unit 12 extracts an object contour line as a boundary between a region representing a tissue where a nodule can be possibly generated (e.g., a lung region) and the nodular region in the cross-sectional image acquired in step Sa1. The object contour line is obtained as a digital curve formed by coupling pixels constituting the boundary of the nodular region (e.g., based on a known eight-coupling rule). Here, it is considered that a binary image is not defined in a region corresponding to the outside of the lung region. That is, a domain of the target binary image is not necessarily rectangular. Further, pixels belonging to a boundary of the domain are prevented from being coupled.

That is, since a nodule is produced in the lung region, the nodular region has a boundary between itself and the lung region. When the nodule is present in the lung region in isolation, a contour of the nodular region is formed of the boundary between the nodular region and the lung region alone. However, the nodule is often generated at an edge part of the lung region, and a contour of the nodular region in this case is formed of a part constituting a boundary between the nodular region and the lung region and a part constituting a boundary between the nodular region and a region other than the lung region (e.g., a region representing a pleura). Thus, the contour circularity computation unit 12 extracts the object contour line as a boundary part between the nodular region and the lung region alone.

Therefore, if the nodular region is present in the lung region in isolation, the object contour line is extracted as including one closed curve component alone.

When the nodular region is in contact with the outside of the lung region at one position as shown in FIG. 11, the object contour line is extracted as a line including one opened curve component alone.

When the nodular region is in contact with the outside of the lung region at two positions as shown in FIG. 12, the object contour line is extracted as a line including two opened curve components.

It is to be noted that pixel coupling components each having a circle mark become the object contour line in FIGS. 11 and 12.

In step Sa4, the contour circularity computation unit 12 selects one unselected component from curve components included in the object contour line extracted as explained above.

In step Sa5, the contour circularity computation unit 12 executes polygonal line circularity computation processing with respect to the selected curve component.

Figure 13:
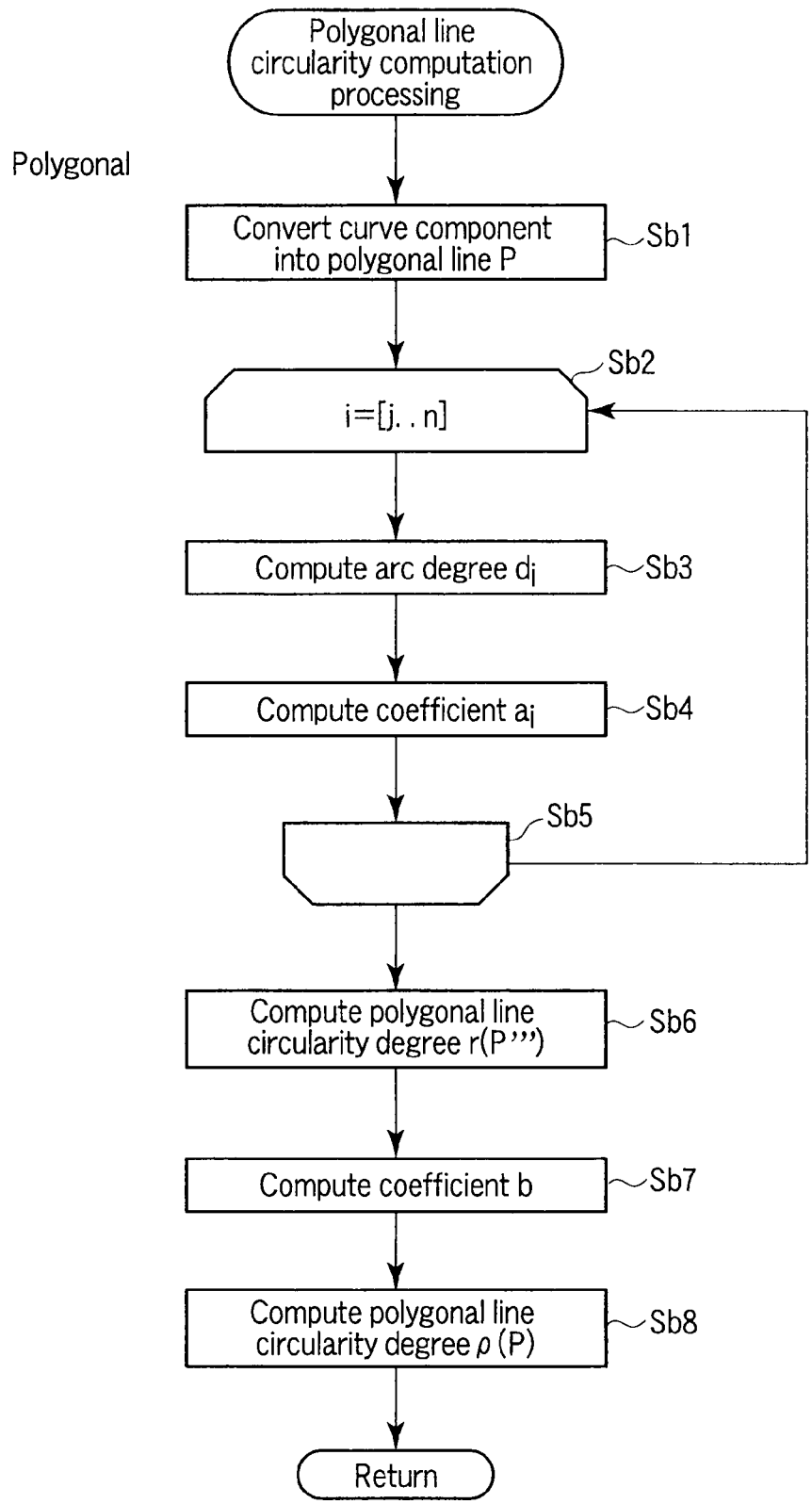
FIG. 13 is a flowchart showing a processing procedure of a contour circularity computation unit in FIG. 1 in polygonal line circularity computation processing.

FIG. 13 is a flowchart showing a processing procedure of the contour circularity computation unit 12 in the polygonal line circularity computation processing.

In step Sb1, the contour circularity computation unit 12 converts a curve component as a processing target into a polygonal line Q.

Figure 14:
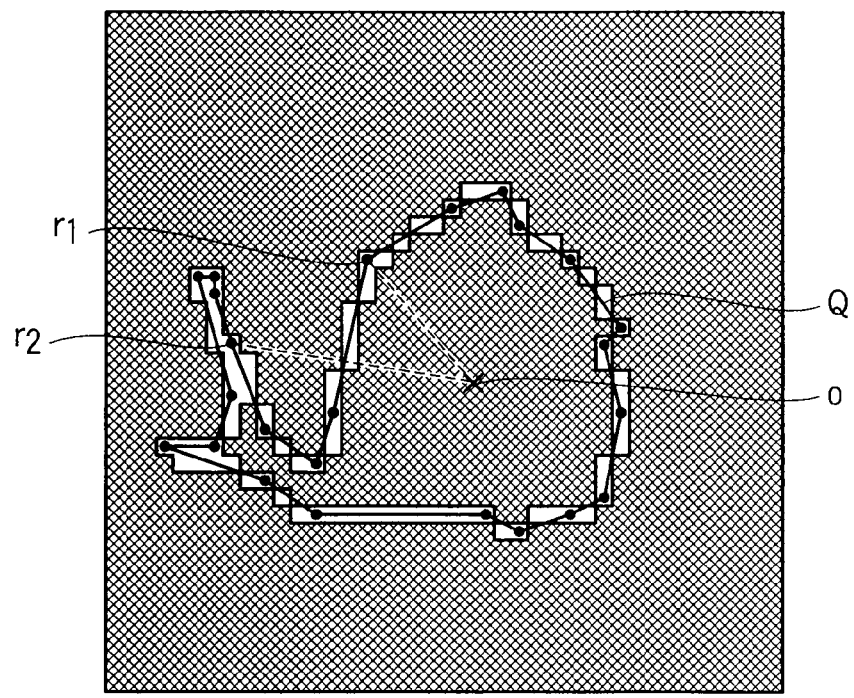
FIG. 14 is a view showing an example of a state of polygonal line approximation with respect to curve components.

Specifically, the contour circularity computation unit 21 approximates a curve component by a polygonal line as shown in FIG. 14, for example. As a polygonal line approximation algorithm, a known technology can be utilized. As the known technology, there is a technology described in, e.g., "Sharaiha Y. M., Christofides N. An optimal algorithm for the straight segment approximation of digital arcs. CVGIP: Graphical Models and Image Processing 1993, 55. 397-407", and this description will be incorporated herein.

Figure 15:
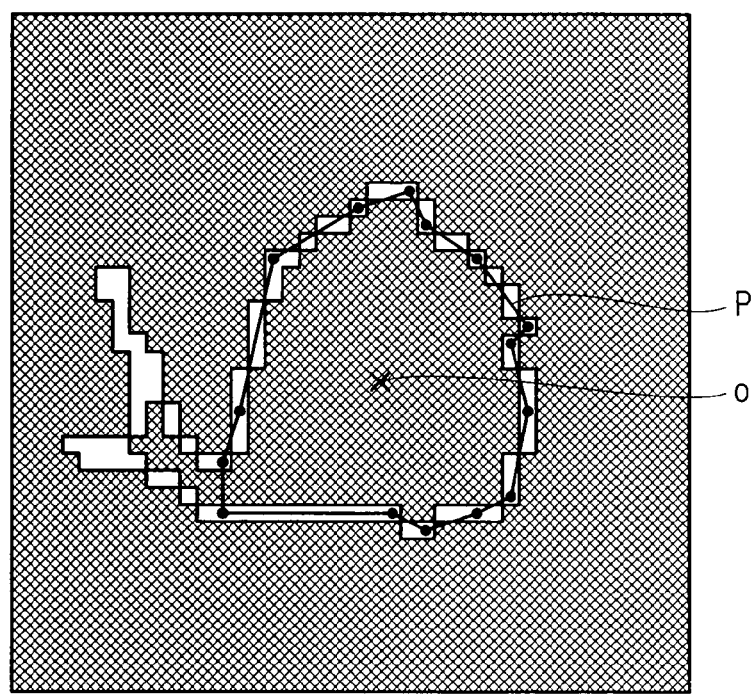
FIG. 15 is a view showing a extraction example of a polygonal line.

Moreover, the contour circularity computation unit 12 performs trimming in such a manner that nodes that can be seen from the reference point o alone are left from nodes (end points and flexural points) of polygonal line Q, thereby obtaining a polygonal line P obtained by deforming polygonal line Q. This trimming is realized by leaving a node r when a line segment between node r and the reference point o does not intersect with polygonal line Q. For example, in FIG. 14, a node $r_1$ is left since a line segment $r_1o$ between node $r_1$ and the reference point o does not intersect with polygonal line Q, but a node $r_2$ is excluded since a line segment $r_2o$ between node $r_2$ and the reference point o intersects with polygonal line Q. As a result, polygonal line P depicted in FIG. 15 is obtained from polygonal line Q shown in FIG. 14.

In this example, nodes of polygonal line P are $p_1, p_2, \ldots, p_{n+1}$ as shown in FIG. 16. However, when polygonal line P is closed, node $p_1$ is equal to node $p_{n+1}$ as shown in FIG. 17. Further, an arbitrary one in nodes $p_1$ to $p_{n+1}$ is represented as a node $p_i$, a midpoint of node $p_{i-1}$ and node $p_i$ is represented as $p_{i-0.5}$, and a midpoint of node $p_i$ and node $p_{i+1}$ is represented as $p_{i+0.5}$, respectively.

In a loop from step Sb2 to step Sb5, the contour circularity computation unit 12 increments a variable i by one from j to n and repeats the processing in steps Sb2 and Sb3. It is to be noted that j is 1 when polygonal line P is closed, and it is 2 when polygonal line P is opened. In step Sb3 in this loop, the contour circularity computation unit 12 computes the degree of arc (which will be referred to as a arc degree hereinafter) $d_i$ related to node $p_i$. The arc degree $d_i$ is a value indicative of how much an angle formed by node $p_i$ approximates a arc, and it can be obtained as follows.

If a line segment $p_{i-1}p_ip_{i+1}$ sufficiently approximates a arc with the reference point o at the center, an area $\Delta p_{i-0.5}op_{i+0.5}$ is substantially equal to an area $\Delta p_{i-1}op_i$ or an area $\Delta p_iop_{i+1}$.

Thus, the arc degree $d_i$ is obtained based on the following expression.

$$d_i = \Delta p_{i-0.5}op_{i+0.5}/\max(\Delta p_{i-1}op_i, \Delta p_iop_{i+1})$$

Figure 18:
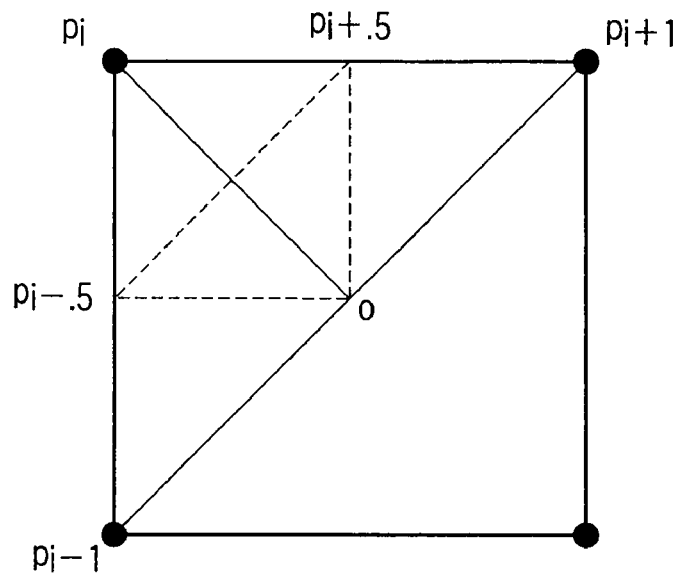
FIG. 18 is a view showing a model for computation of the degree of arc related to a square polygonal line.
Figure 19:
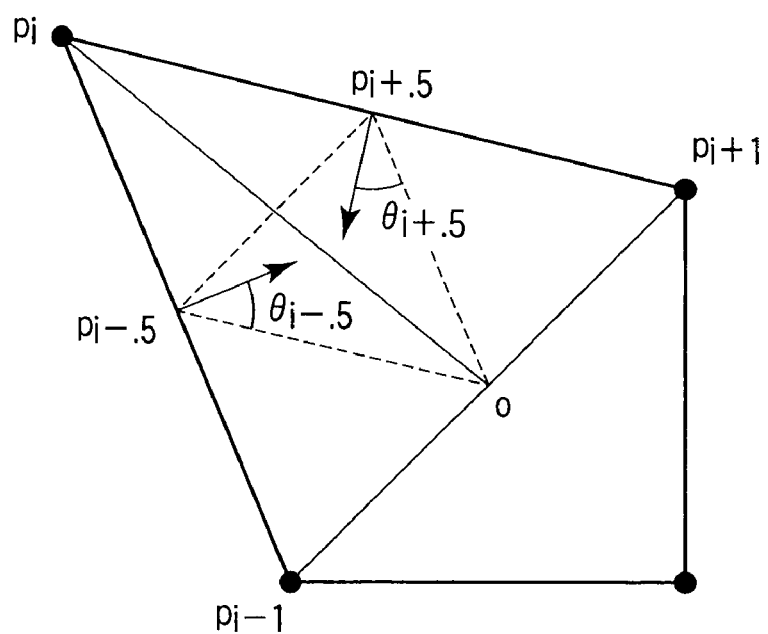
FIG. 19 is a view showing a model for computation of the degree of arc related to a polygonal line having a shape in which one of nodes deviates from a square.

Meanwhile, when nodes $p_{i-1}$, $p_i$, and $p_{i+1}$ match with apexes of a square having the reference point o at the center as shown in FIG. 18, the arc degree $d_i$ is 0.5, and this is intuitively an appropriate value. However, the arc degree $d_i$ does not vary even though node $p_i$ deviates the square as shown in FIG. 19, and this is against the intuition.

Thus, in step Sb3, the contour circularity computation unit 12 computes a coefficient $a_i$ that compensates the above situation.

To compute coefficient $a_i$, the contour circularity computation unit 12 takes a line segment which is orthogonal to a line segment $p_{i-1}p_i$ at node $p_{i-0.5}$ and extended toward the reference point o, and obtains an angle $\theta_{i-0.5}$ formed between this line segment and a line segment $p_{i-0.5}$ and an angle $\theta_{i+0.5}$ likewise formed at node $p_{i+0.5}$.

When area $\Delta p_{i-1}op_i$ is greater than or equal to area $\Delta p_iop_{i+1}$, $\cos \theta_{i-0.5}$ is determined as coefficient $a_i$. In any other case, $\cos \theta_{i+0.5}$ is determined as coefficient $a_i$. Then, a value $a_id_i$ obtained by multiplying this coefficient $a_i$ by the arc degree $d_i$ satisfactorily represents how much line segment $p_{i-1}p_ip_{i+1}$ approximates a arc.

Figure 20:
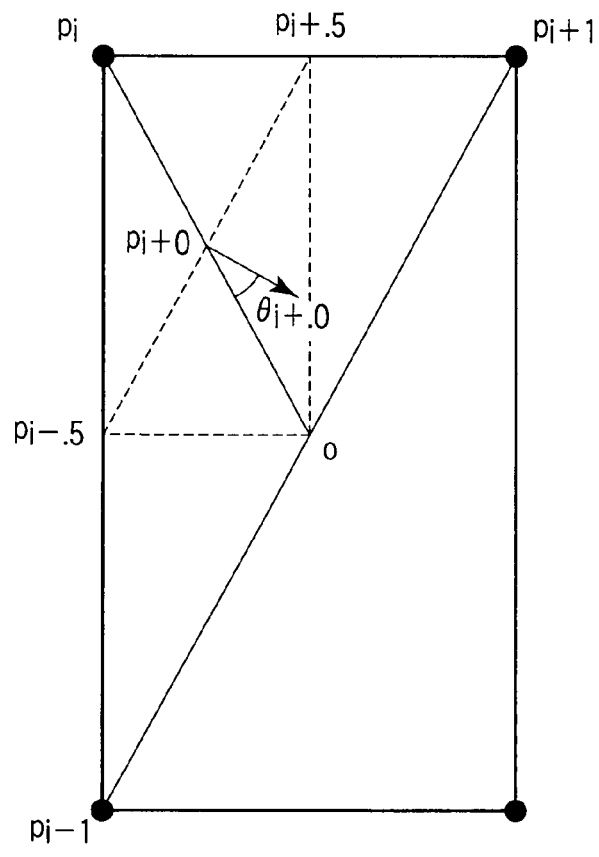
FIG. 20 is a view showing a model for computation of the degree of arc related to a square polygonal line.

On the other hand, when line segment $p_{i-1}p_i$ and line segment $p_ip_{i+1}$ form two sides of a rectangle having the reference point o at the center as shown in FIG. 20, the value $a_id_i$ is likewise 0.5. However, since $\cos \theta_{1-0.5} = \cos \theta_{i+0.5} = 1$ is achieved, the value $a_id_i$ becomes constant irrespective of the ratio of the lengths of line segments $p_{i-1}p_i$ and $p_ip_{i+1}$.

Thus, a line segment which is orthogonal to line segment $p_{i-0.5}p_{i+0.5}$ at the midpoint (represented as $p_{i+o}$) of line segment $p_{i-0.5}p_{i+0.5}$ and extended toward the reference point o is taken, and an angle formed between this line segment and $p_{i+o}$o is determined as $\theta_{i+o}$. Further, the contour circularity computation unit 12 determines the smaller of cos $\theta_{i+0}$ and cos $\theta_{i-0.5}$ as coefficient $a_i$ when area $\Delta p_{i-1}op_i$ is greater than or equal to area $\Delta p_i op_{i+1}$, and determines the smaller of cos $\theta_{i+0}$ and cos $\theta_{i+0.5}$ as coefficient $a_i$ in any other case.

Figure 21:
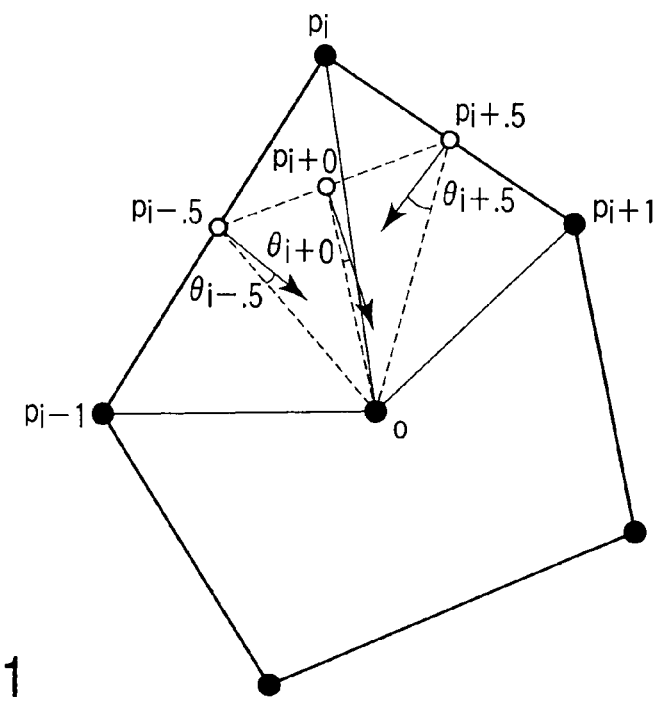
FIG. 21 is a view showing a model for computation of the degree of arc related to a polygonal line having a general contour shape.

Coefficient $a_i$ is reduced as the rectangle is extended under such a definition. Therefore, it can be said that the value $a_i d_i$ is an appropriate index indicative of how much line segment $p_{i-1}p_i p_{i+1}$ approximates a arc. FIG. 21 shows the defined line segments and points in a further general contour shape.

When terminating conditions for the loop of steps Sb2 to Sb5 are attained, the arc degree $d_i$ and coefficient $a_i$ are computed in relation to each node other than the node that is an end point of polygonal line P in nodes $p_1$ to $p_{n+1}$ of polygonal line P. That is, when polygonal line P is opened as shown in FIG. 16, arc degrees $d_2, d_3, \ldots, d_n$ and coefficients $a_2, a_3, \ldots, a_n$ are computed in relation to the respective nodes $p_2, p_3, \ldots, p_n$. Further, when polygonal line P is closed as shown in FIG. 17, arc degrees $d_1, d_2, \ldots, d_n$ and coefficients $a_1, a_2, \ldots, a_n$ are computed in relation to the respective nodes $p_1, p_2, \ldots, p_n$.

In step Sb6, the contour circularity computation unit 12 computes a degree that can be regarded as approximation of polygonal line P with respect to a arc (which will be referred to as a polygonal line circularity degree hereinafter) $\rho(P)$ as an average value of $a_i d_i$ weighted by an angle $\angle p_{i-1}op_{i+1}$. That is, the polygonal line circularity degree is defined by the following expression.

$$\sum_{i=j}^{n} a_i d_i \angle p_{i-1}op_{i+1} / \sum_{i=j}^{n} \angle p_{i-1}op_{i+1}$$

wherein $p_{i-1}$ is indicative of $p_n$ when polygonal line P is closed, i.e., when j=1 and i=1 are achieved.

Meanwhile, the number of nodes included in polygonal line P varies in accordance with an approximation accuracy in polygonal line approximation. That is, as a typical pattern, the number of nodes increases when the approximation accuracy is increased, and decreases when the approximation accuracy is reduced. Further, in general, the accuracy of a polygonal line circularity degree is increased as the number of nodes is increased, whereas the processing time is increased by an increase in the number of arithmetic operations. Thus, it is desirable to appropriately adjust the approximation accuracy in accordance with the accuracy that is required for the polygonal line circularity degree. The approximation accuracy may be fixed to a preset value, but it may be adaptively set in accordance with a condition value such as a distance conversion value at the reference point o or may be set to a value desired by a user. It is to be noted that a parameter that is used to control the approximation accuracy is shown in the algorithm for the known polygonal line approximation, and adjusting this parameter realizes adjustment of the approximation accuracy.

Furthermore, in the above description, each of all nodes of polygonal line P has a convex shape. However, a node having a concave shape like a node $p_i$ in, e.g., FIG. 22 may be included in some cases. When such a concave node is included, a polygonal line circularity degree is computed as a value that is large beyond necessity as compared with a case where all nodes are convex, which is against the intuition.

Thus, the contour circularity computation unit 12 obtains a polygonal line in which all nodes as circularity degree computation targets are convex as follows, and performs the polygonal line circularity computation processing with respect to this polygonal line. Furthermore, the contour circularity computation unit 12 acquires an area that is utilized to compute a later-explained coefficient b in a process of obtaining the polygonal line as the polygonal line circularity computation processing target.

(When Broken Line P is Closed)

The contour circularity computation unit 12 obtains a polygonal line P' having o, $p_1, \ldots, p_{n+1}$, o as nodes as shown in FIG. 22. Additionally, area (P') surrounded by this polygonal line P' is computed.

Then, the contour circularity computation unit 12 determines a convex hull that contains all nodes included in polygonal line P' as a polygonal line P'''. It is to be noted that the convex hull can be obtained by utilizing, e.g., a known technique. That is, when a polygon represented by polygonal line P' has a shape having a concave portion 20 as shown in FIG. 22, polygonal line P' is deformed to surround this concave portion 20 to obtain such a polygonal line P''' as shown in FIG. 23. It is to be noted that, when polygonal line P''' is the convex hull, polygonal line P''' is equal to polygonal line P'. Further, the contour circularity computation unit 12 acquires area (P''') of a region surrounded by polygonal line P'''.

Furthermore, the contour circularity computation unit 12 determines polygonal line P''' as a polygonal line p''' which is a polygonal line circularity computation processing target as it is as shown in FIG. 24.

(When Broken Line P is Opened)

The contour circularity computation unit 12 obtains a polygonal line P' having O, $p_1, \ldots, p_{n+1}$, o as nodes as shown in FIG. 25. Further, area (P') of a region surrounded by this polygonal line P' is obtained.

Then, the contour circularity computation unit 12 determines a convex hull containing all the nodes included in polygonal line P' as a polygonal line P'''. However, a line segment $op_1$ and a line segment $p_{n+1}o$ are left as they are. That is, if a polygon represented by polygonal line P' has a shape having such a concave portion 20 as shown in FIG. 25, polygonal line P' is deformed to surround this concave portion 20 to obtain such a polygonal line P''' as depicted in FIG. 26. It is to be noted that, if polygonal line P' is a convex hull, polygonal line P''' is equal to polygonal line P'. Further, the contour circularity computation unit 12 acquires area (P''') of a region surrounded by polygonal line P'''.

Furthermore, the contour circularity computation unit 12 determines such a polygonal line as shown in FIG. 27 that is reopened from the nodes of polygonal line P''' except the reference point o as a polygonal line p''' that is a polygonal line circularity computation processing target.

Moreover, the contour circularity computation unit 12 carries out the processing from step Sb1 to step Sb6 with respect to polygonal line P''' to compute a polygonal line circularity degree $\rho(P''')$.

In step Sb7, the contour circularity computation unit 12 computes a coefficient b as the ratio of area (P') to area (P'''). That is, coefficient b is obtained based on the following expression.

$$b = \text{area}(P')/\text{area}(P''')$$

In step Sb8, the contour circularity computation unit 12 computes a polygonal line circularity degree $\rho(P)$ related to polygonal line P as the value obtained by multiplying the polygonal line circularity degree ρ(P''') by coefficient b. That is, a polygonal line circularity degree ρ(P) is computed based on the following expression.

$$\rho(P)=b\cdot\rho(P''')=(\text{area}(P')/\text{area}(P'''))\rho(P''')$$

When the polygonal line circularity degree ρ(P) is computed in this manner, the contour circularity computation unit 12 terminates the polygonal line circularity computation processing and advances to step Sa6 from step Sa5 in FIG. 2.

In step Sa6, the contour circularity computation unit 12 confirms whether an unselected curve component is present. Moreover, when an unselected curve component is present, the contour circularity computation unit 12 returns to step Sa4 from step Sa6. Additionally, the contour circularity computation unit 12 reselects the unselected curve component in step Sa4, and then performs the polygonal line circularity computation processing in step Sa5 with respect to this curve component. Steps Sa4 to Sa6 are repeated for the necessary number of times, whereby each of one or more polygonal line circularities ρ(P) associated with each of one or more curve components included in an object contour line is computed.

When computation of the polygonal line circularities ρ(P) of all curve components included in the object contour line is completed, the contour circularity computation unit 12 advances to step Sa7 from step Sa6. In step Sa7, the contour circularity computation unit 12 computes a degree (which will be referred to as a cross-sectional contour circularity degree hereinafter) that can be regarded as arc approximation of a contour of a nodular region that appears in a cross-sectional image as a current processing target as a weighting average of one or more polygonal line circularities ρ(P) computed as explained above. In this regard, as a weight related to polygonal line P, an angle $\angle p_1 o p_{n+1}$ formed between a line segment $p_1 o$ and a line segment $o p_{n+1}$ related to polygonal line P is adopted.

For example, as shown in FIG. 28, it is assumed that an object contour line includes m curve components and a polygonal line P and a polygonal line circularity degree ρ(P) associated therewith are obtained from a kth curve component as explained above. In this case, when $\rho_k$ represents ρ(P) and φk represents $\angle p_1 o p_{n+1}$ for the kth component, a cross-sectional contour circularity degree can be computed based on the following expression.

$$\sum_{k=1}^{m} \phi_k \rho_k / \sum_{k=1}^{m} \phi_k$$

In step Sa8, the contour circularity computation unit 12 confirms whether an unprocessed target cross section is present. When an unprocessed target cross section is present, the contour circularity computation unit 12 returns to step Sa2 from step Sa8. Further, the contour circularity computation unit 12 again acquires a cross-sectional image related to an unselected cross section in step Sa2, and then carries out the processing from step Sa3 to step Sa7 as explained above. Thus, repeating steps Sa2 to Sa8 for the necessary number of times enables computation of a cross-sectional contour circularity degree associated with each of a plurality of necessary cross sections related to a processing target image.

When computation of the cross-sectional contour circularity degree of each of the plurality of necessary cross sections is terminated, the contour circularity computation unit 12 advances to step Sa9 from step Sa8.

In step Sa9, the contour circularity computation unit 12 computes a contour circularity degree of a nodular region as a representative value of the plurality of thus computed cross-sectional circularities. As the representative value, a median value or an average value can be used, for example.

Second Embodiment

An operation of a diagnostic imaging support processing apparatus 1 according to a second embodiment will now be explained hereinafter.

Figure 29:
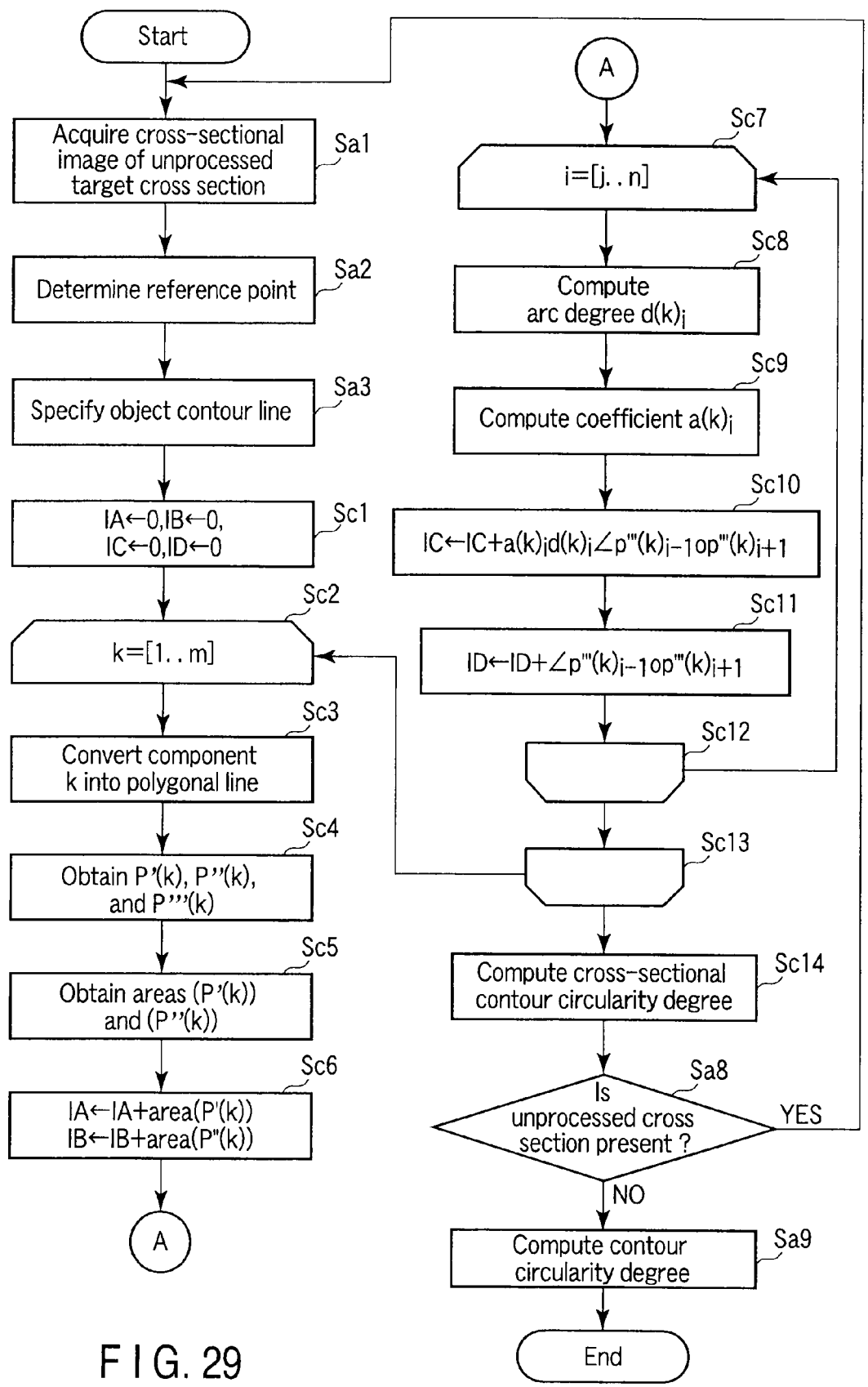
FIG. 29 is a flowchart showing a processing procedure in a second embodiment of the contour circularity computation unit depicted in FIG. 1.

FIG. 29 is a flowchart showing a processing procedure of a contour circularity computation unit 12 in the second embodiment. It is to be noted that like reference numerals denote steps in which processing the same as that in FIG. 2 is executed, and a description of processing in these steps will be omitted.

The contour circularity computation unit 12 first carries out steps Sa1 to Sa3 like the first embodiment and then advances to step Sc1.

In step Sc1, the contour circularity computation unit 12 initializes each of integrated values IA, IB, IC, and ID to 0.

In a loop of steps Sc2 to Sc13, the contour circularity computation unit 12 repeats the processing in steps Sc3 to Sc12 while incrementing a variable k by one from 1 to m. It is to be noted that m is the number of curve components included in an object contour line.

In step Sc3, the contour circularity computation unit 12 converts a curve component k into a polygonal line like step Sb1.

In step Sc4, the contour circularity computation unit 12 obtains polygonal lines P'(k), P''(k), and P'''(k) related to the component k like polygonal lines P', P'', and P''' in the first embodiment.

In step Sc5, the contour circularity computation unit 12 obtains areas (P'(k)) and (P''(k)) related to polygonal lines P'(k) and P''(k) like areas (P') and (P'') in the first embodiment.

In step Sc6, the contour circularity computation unit 12 adds the value of area (P'(k)) to the integrated value IA and also adds the value of area (P''(k)) to the integrated value IB.

Subsequently, the contour circularity computation unit 12 repeats processing from step Sc8 to step Sc11 while incrementing a variable i by one from j to n in a loop of steps Sc7 to Sc12. It is to be noted that j is 1 when polygonal line P is closed and it is 2 when polygonal line P is opened. Furthermore, n is the value obtained by subtracting one from the number of nodes $p'''(K)_1, p'''(K)_2, \ldots, p'''(K)_{n+1}$ in polygonal line P''' (k).

In step Sc8, the contour circularity computation unit 12 computes a circularity degree $d(k)_i$ related to a node $p'''(k)_i$ like step Sb3.

In step Sc9, the contour circularity computation unit 12 computes a coefficient $a(k)_i$ related to node $p'''(K)_i$ like step Sb4.

In step Sc10, the contour circularity computation unit 12 adds the value obtained from the following expression to the integrated value IC.

$$a(k)_i d(k)_i \angle p'''(k)_{i-1} o p'''(k)_{i+1}$$

In step Sc11, the contour circularity computation unit 12 adds the value of $\angle p'''(k)_{i-1} o p'''(k)_{i+1}$ to the integrated value ID.

In this manner, the processing of the loop of steps Sc7 to Sc12 is incorporated in the loop of steps Sc1 to Sc13, and it is executed with respect to each of polygonal lines P'''(1) to P'''(m). Moreover, in the loop of steps Sc1 to Sc13, all of the integrated values IA, IB, IC, and ID are not initialized. Therefore, when terminating conditions for the loop of steps Sc1 to Sc13 are achieved, each of the integrated values IA, IB, IC and ID indicates the following value. That is, the integrated value IA is a sum total of areas (P'(1)) to (P'(m)). The integrated value IB is a sum total of areas (P"(1)) to (P"(m)). The integrated value IC is a sum total of products of values of the circularity degree $d(k)_i$, coefficient $a(k)_i$, and angle $\angle p'''(k)_{i-1} o p'''(k)_{i+1}$ related to each node $p'''(K)_i$. The integrated value ID is a sum total of values of angle $\angle p'''(k)_{i-1} o p'''(k)_{i+1}$ related to each node $p'''(K)_i$.

In step Sc14, the contour circularity computation unit 12 computes a cross-sectional contour circularity degree based on the following expression.

$$(IA/IB)IC/ID$$

That is, the cross-sectional contour circularity degree can be represented by the following expression.

$$\frac{\sum_{k=1}^{m} area(P'(k))}{\sum_{k=1}^{m} area(P''(k))} \frac{\sum_{k=1}^{m} \sum_{i=j}^{n(k)} a(k)_i d(k)_i \angle p'''(k)_{i-1} o p'''(k)_{i+1}}{\sum_{k=1}^{m} \sum_{i=j}^{n(k)} \angle p'''(k)_{i-1} o p'''(k)_{i+1}}$$

Then, the contour circularity computation unit 12 carries out step Sa8 and step Sa9 like the first embodiment. However, when presence of an unprocessed target cross section is confirmed in step Sa8, the contour circularity computation unit 12 repeats the processing in steps Sa1 to Sa3 and Sc1 to Sc14.

In the operation in the first embodiment and the operation in the second embodiment, the procedures are different, but contour circularities computed as results are equal.

Thus, according to each of the foregoing embodiments, a contour circularity degree of a nodular region can be computed based on a circularity degree related to a polygonal line defined near a border between a region representing a tissue where a nodule can be possibly produced and the nodular region without considering a shape of the border between a region representing any other tissue and the nodular region. As a result, the contour circularity degree can serve as an index that can uniformly quantify a nodule irrespective of a nodular lesion that is in contact with a pleura or an isolated nodular lesion. Using such a contour circularity degree enables selecting a nodular lesion with low false positive and a high sensitivity.

Additionally, according to this embodiment, since a representative value of contour circularities computed with respect to each of a plurality of cross sections having different directions is determined as a final contour circularity degree (which is also called a contour sphericity), a contour circularity degree as a result of three-dimensionally analyzing a nodular region is computed, thereby providing a highly accurate contour circularity degree.

This embodiment can be modified in many ways as follows.

If a cross-sectional image successfully showing a circularity degree of a nodular region can be selected, a cross-sectional contour circularity degree computed from this cross-sectional image can be adopted as a final contour circularity degree of the nodular region as it is.

As the reference point o, a point specified by a user may be adopted.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A diagnostic imaging support processing apparatus comprising:
    a nodular region determination unit which determines a nodular region included in an image showing the inside of a subject;
    a polygonal line approximation processing unit which obtains a plurality of nodes constituting a polygonal line that approximates a contour of the nodular region;
    a reference position determination unit which determines a position of a reference point; and
    a circularity computation unit which computes the degree of circularity by using areas of a plurality of regions determined based on the plurality of nodes and the reference point.

2. The diagnostic imaging support processing apparatus according to claim 1, wherein the circularity computation unit computes the degree of circularity by performing correction according to an angle formed between a perpendicular line of a straight line coupling two nodes and a straight line coupling a midpoint of the straight line coupling the two nodes with the reference point.

3. The diagnostic imaging support processing apparatus according to claim 2, wherein the circularity computation unit computes the degree of circularity by further performing correction according to an angle formed between a perpendicular line of a third straight line coupling midpoints of first and second straight lines coupling one node with the other two nodes and a fourth straight line coupling a midpoint of the third straight line with the reference point.

4. The diagnostic imaging support processing apparatus according to claim 1, further comprising a polygonal line modulation unit which modifies the polygonal line to eliminate a concave portion and thereby obtains a modified polygonal line when the concave portion that is concave on the reference point side is present in the polygonal line,
    wherein the circularity computation unit computes the degree of circularity by using areas of a plurality of regions determined based on nodes included in the modified polygonal line and the reference point.

5. The diagnostic imaging support processing apparatus according to claim 4, wherein the circularity computation unit computes the degree of circularity by further performing correction according to an area of a region surrounded by the polygonal line and an area of a region surrounded by the modified polygonal line.

6. A diagnostic imaging support processing apparatus comprising:
    a unit which obtains a plurality of processing cross sections that divide an image of a three-dimensional spatial image in a subject;
    a nodular region determination unit which determines a nodular region included in an image associated with the processing cross sections;
    a polygonal line approximation processing unit which obtains a plurality of nodes constituting a polygonal line that approximates a contour of the nodular region;
    a reference position determination unit which determines a position of a reference point; and a circularity computation unit which computes a degree of circularity by using areas of a plurality of regions determined based on the plurality of nodes and the reference point.

7. The diagnostic imaging support processing apparatus according to claim 6, wherein the processing cross sections are obtained by using an algorithm based on a Voronoi diagram.

8. A diagnostic imaging support processing apparatus comprising:
- a nodular region determination unit which determines a nodular region included in an image representing the inside of a subject;
- a contour extraction unit which extracts a contour of the nodular region;
- an organ region detection unit which detects a region of a predetermined organ;
- a determination unit which determines whether the nodular region is in contact with a part outside the organ region; and
- a circularity computation unit which computes the degree of circularity based on information of the contour of the nodular region and a determination result of the determination unit.

9. A diagnostic imaging support processing apparatus comprising:
- a extraction unit which determines a plurality of nodes near a border between a region representing a tissue in which generation of a nodule is possible and a nodular region which is possibly the nodule in a cross-sectional image of a subject, and extracts a contour of the nodular region as one or more polygonal lines formed of a plurality of line segments each having as end points two nodes adjacent to each other along the border in the plurality of nodes;
- a first unit which obtains one or more modified polygonal lines by modifying the one polygonal line or each of the plurality of polygonal lines into a shape having no portion that is concave on a reference point side;
- a second unit which computes a plurality of characteristic amounts related to each of the plurality of nodes serving as an end point common to two in a plurality of line segments included in the one or more modified polygonal lines;
- a third unit which obtains one or more first areas as an area of each region surrounded by the one polygonal line or each of the plurality of polygonal lines;
- a fourth unit which obtains one or more second areas as an area of each region surrounded by the one modified polygonal line or each of the plurality of modified polygonal lines; and
- a fifth unit which computes the degree of circularity of the nodular region in the cross-sectional image based on the plurality of characteristic amounts and each of the one or more first areas and the one or more second areas.

10. A non-transitory computer readable medium storing program instructions for diagnostic imaging support processing that allows a computer to function as:
- a nodular region determination unit which determines a nodular region included in an image showing the inside of a subject;
- a polygonal line approximation processing unit which obtains a plurality of nodes constituting a polygonal line that approximates a contour of the nodular region;
- a reference position determination unit which determines a position of a reference point;
- a circularity computation unit which computes the degree of circularity by using areas of a plurality of regions determined based on the plurality of nodes and the reference point.

* * * * *